Patented Feb. 8, 1949

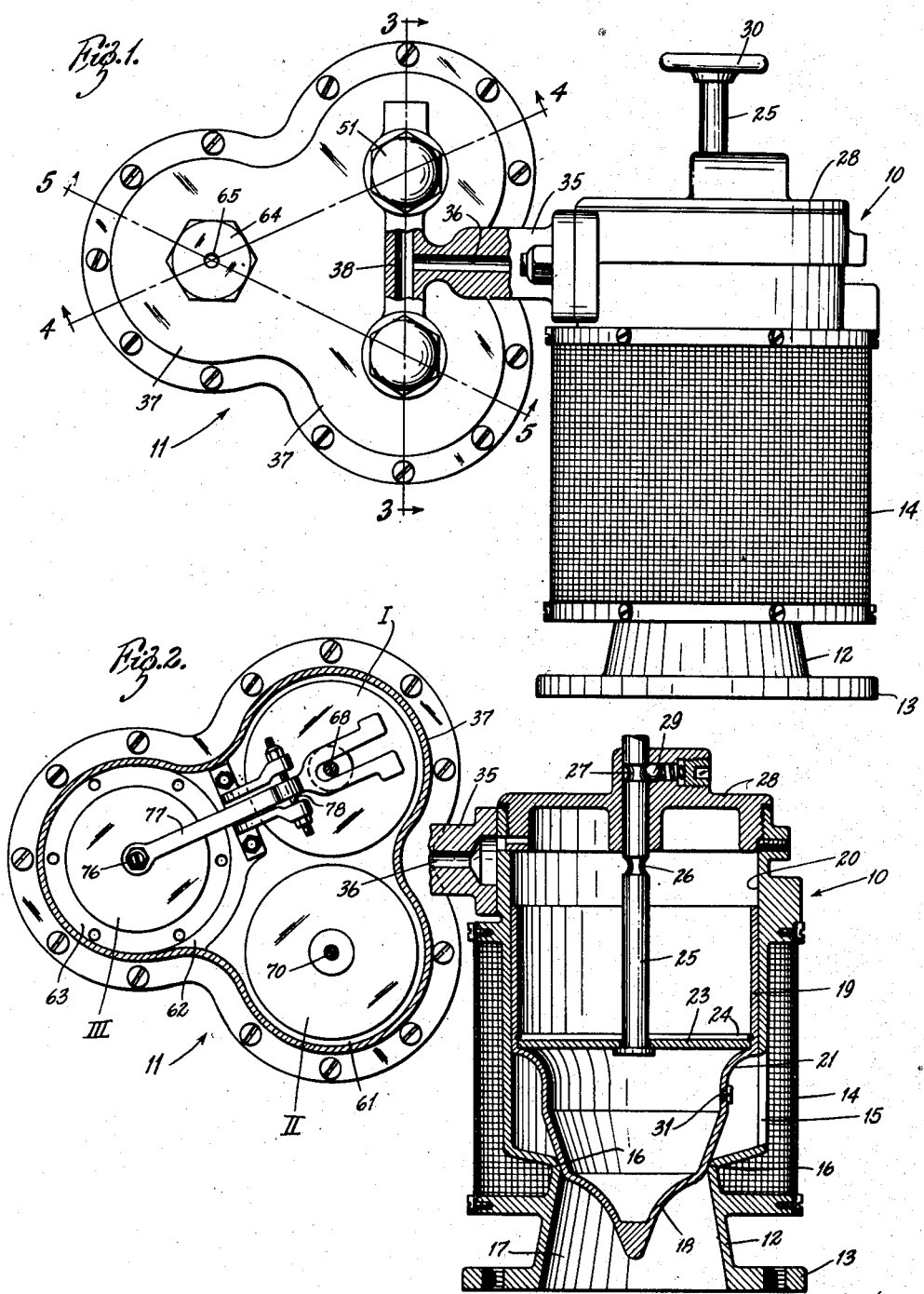

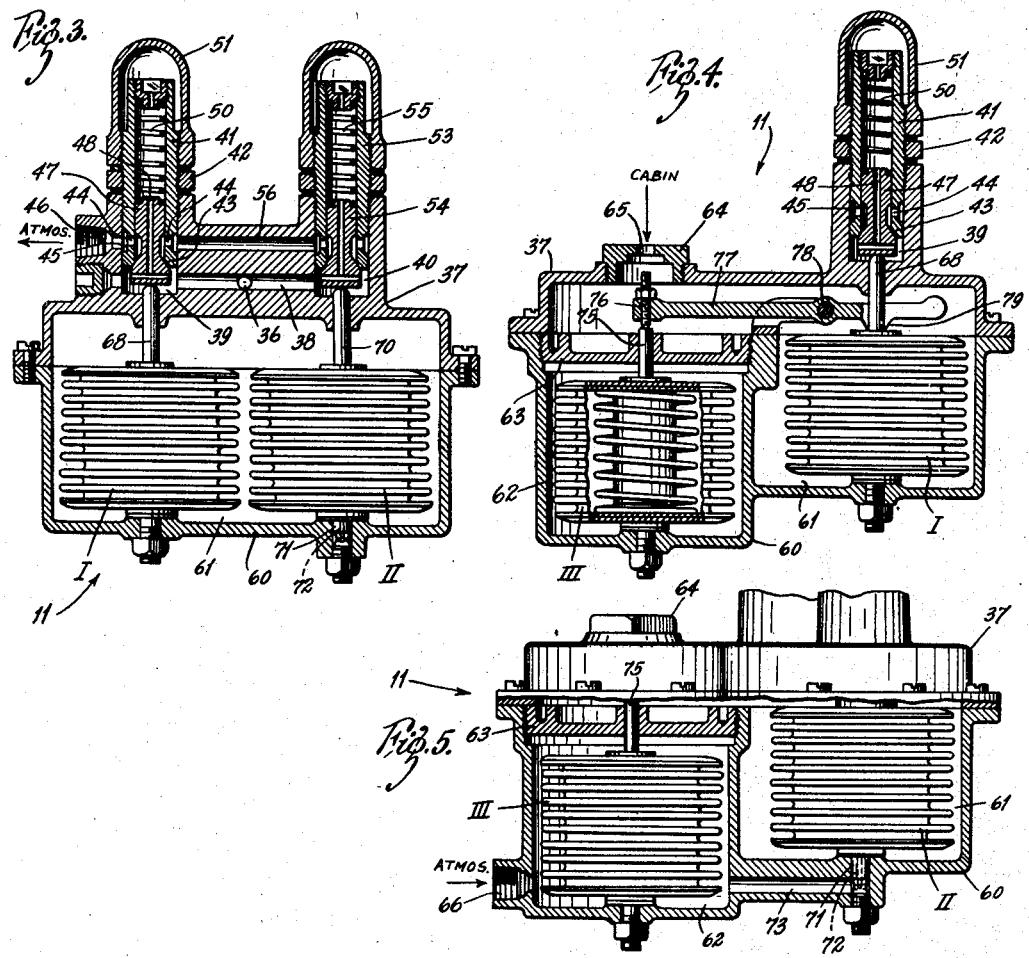
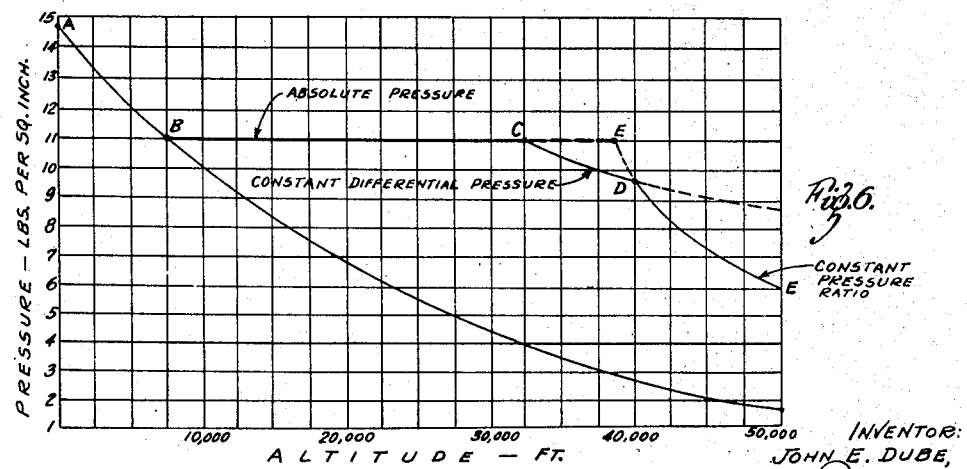

2,461,415

UNITED STATES PATENT OFFICE 2,461,415

PRESSURE-REGULATING VALVE

John E. Dube, St. Louis County, Mo., assignor to Alco Valve Company, Maplewood, Mo., a corporation of Missouri Application May 22, 1942, Serial No. 444,041

10 Claims. (Cl. 98—1.5)

The present invention relates to a pressure regulating valve, and more particularly to a pressure regulating valve having a pilot control thereon, which pilot control causes the difference in pressure on the two sides of the valve to follow a predetermined pattern upon changes in pressure on one of the said two sides of the valve.

A particular object of the invention is to provide a valve to control flow of fluid from an enclosure, with a control therefor, the valve controlling interior pressures in accordance with variations in exterior pressures, with the interior pressures at times above the exterior pressure, but never exceeding the exterior pressure beyond a predetermined amount, nor beyond a predetermined ratio between exterior and interior pressures.

Further objects include the provision of pressure-responsive means controlling the valve adapted for use in determining the flow of air from an aircraft cabin, or the like, in such wise as to maintain a pressure in the cabin equal to atmosphere up to a certain altitude, thereafter constant to a second altitude, thereafter remaining constant different from atmospheric pressure to a third altitude and beyond said third altitude bearing a predetermined ratio to atmospheric pressure.

A further object is to provide a control for air pressures within an aircraft cabin or the like, that are maintained above external pressures, the control preventing internal pressures from exceeding values within the normal range of the supercharger employed to raise the internal pressures above the external.

In the drawings:

Fig. 1 is a plan view of the valve and controlling pilot;

Fig. 2 is a sectional view through the main valve of Fig. 1, and through the top part of the pilot structure;

Fig. 3 is a vertical section on the line 3—3 of Fig. 1;

Fig. 4 is a vertical section on the line 4—4 of Fig. 1;

Fig. 5 is a vertical section partly broken away on the line 5—5 of Fig. 1; and,

Fig. 6 is a diagram of the pressure conditions produced by this control.

Certain parts of this invention appear also in copending application of this applicant, filed May 11, 1942, Serial No. 442,507, for Air control valve, now Patent No. 2,433,206.

Broadly speaking, the invention includes a main valve 10 adapted to be secured over a port in the wall of the chamber, the internal pressure of which is to be controlled relative to the external pressure, such as a port through the wall of the fuselage of an airplane. In addition, it includes a pilot valve mechanism 11 by means of which the main valve 10 is controlled. The main valve 10 includes a body 12 that may be secured by its flange 13 to the fuselage. A screen 14 surrounds a part of the valve body 12 to screen air from the cabin to an inlet port and annular inlet chamber 15 of the valve. There is also provided a circular valve seat 16 within the valve housing 12, and beyond this an outlet 17 leading outside the fuselage.

A valve element 18 seats upon the seat 16. It has a cylindrical skirt portion 19 loosely slidable within the cylindrical portion 20 of the valve housing 12. Below the cylindrical skirt 19, the valve 18 becomes smaller to provide a pressure portion 21, generally annular in shape, and which receives cabin pressure applied through the inlet port 15 and distributing itself around the annular chamber within the housing below the portion 21.

Within the valve 18 is a disc 23 held by a spring ring 24. This disc receives a headed plunger 25 notched at 26 and 27, and passing through a head 28 attached to the cylindrical portion 20 of the valve housing 12. A spring-pressed ball 29 engages with either notch 26 or 27. A handle 30 is provided upon the stem 25. As shown in Fig. 2, the valve is permitted to be in its lower position, but may be lifted as the disc 23 freely moves upon the stem 25. The handle 30 may be lifted to engage the notch 26 with the ball 29 to hold the valve open.

From the foregoing, it may be seen that cabin pressure may act upon the annular portion 21 of the valve 18 to lift the same against gravity, provided the pressure condition above the valve does not resist this cabin pressure. The cabin pressure may leak around the skirt 19 through the upper part of the cylinder 20 to equalize it, and this may be facilitated by removal of the plug 31, if desired.

Control of the head pressure over the valve is accomplished through bleeding of air above the valve through a pilot valve mechanism, the bleeding being permitted to occur at rates greater than the leakage of air from the inlet chamber to the cylinder head.

To this end, a member 35 having a port 36 is secured to the top of the cylinder, so that the port 36 may bleed air therefrom. The member 35 forms a part of the head 37 of the valve mechanism 11. The port 36 leads to a cross port 38 within the pilot valve head 37. One end of the cross port 38 leads to a first pilot valve chamber 39 and the other end to a second pilot valve chamber 40.

These two pilot valves are identical, and a description of one will suffice for both.

A sleeve 41 is threaded into the chamber 39 to a desired distance and secured there by a lock nut 42. This distance is adjustable. The sleeve at its bottom has a valve seat 43 and above the valve seat has radial openings 44 passing through the sleeve, and all connected with the annular groove 45 around the sleeve as shown. The annular groove registers with the port 46 leading to atmosphere.

The valve seat 43 is controlled by a slidable valve member 47 disposed within the sleeve. Internal passages 48 within the valve 47 admit pressure from the port 38 to the upper part of the valve to equalize the same. The valve is normally urged down by a spring 50 within the sleeve 41. A cover cap 51 is secured to the sleeve.

Similarly, in the valve chamber 40 is a sleeve 53 that may be held in adjusted position. In this sleeve is a valve 54 urged away from its seat by a spring 55. The outlet ports of the valve 54 communicate with a port 56 that, in turn, leads to the outlet 46. thus putting the two valves 47 and 54 in parallel.

It will be seen that opening either valve 47 or 54 will release the air above the valve 18, and may permit the same to open.

The pilot valve mechanism head 37 is mounted upon a body portion 60. This body portion provides a chamber 61 opening directly into the valve head and disposed immediately below the two pilot valves 47 and 54. In addition, the pilot valve body member 60 has a chamber 62 sealed from the chamber 61 and enclosed at its top by a disc 63 threaded thereinto.

The pilot valve head 37 has at its top, a plug 64 with a port 65 adapted to communicate with the interior of the cabin (Fig. 4).

The enclosed chamber 62 has a connection 66 whereby atmospheric pressure may be introduced thereinto (Fig. 5).

The first control of the valve 47, aside from its spring 50, is a bellows I. The control for the valve 54 is a bellows II. The bellows I and II are disposed within the chamber 60. An additional control for the valve 47 is provided by bellows III disposed within the chamber 62. Each of these bellows is provided with an internal spring of predetermined strength, as indicated in Fig. 4, the springs urging the bellows to expand. For present purposes, it will be assumed that the effective areas of the several bellows is unity, as the assumption will eliminate one factor of calculations to be made.

The bellows I has at its top a pin 68 slidably disposed through the head 37, and engaging the bottom of the valve 47. Thus, the bellows I applies a predetermined force of resistance against the opening force upon the valve 47 produced by the spring 50. This opposing force of the bellows I is subject to modification by cabin pressure surrounding the outside of the bellows; and it will be seen that, if cabin pressure increases, the bellows I will be contracted, which may permit the valve 47 to open and the valve 18 to open until the cabin pressure reduces to its predetermined maximum. It is also fairly obvious that adjustment of the sleeve 41 alters the relationship of the valve 47 and changes the initial compression of the bellows I and its spring, thereby to adjust the absolute pressure at which the bellows I operates the valve.

Since the valve 54 is in parallel with the valve 47, the valve 54 may take over control under certain conditions. This valve is under the control of the bellows II operating through the pin 70. The bellows II contains a spring of predetermined strength within it. Its interior also communicates with atmosphere. The lower stud 71, depending from the bellows II has a port 72 extending down to communicate with the port 73 within the pilot valve body member 60, and which leads to the chamber 62 that is at atmospheric pressure.

The valve 54 is hence urged to open position by a combination of the pressure of the spring 50 and cabin pressure, but urged to closed position by the pressure of the bellows II, which is a combination of the force of its spring and atmospheric pressure. The spring pressure of the bellows II may be adjusted by adjusting the sleeve 53. It will be seen that, since the spring pressures of the spring 50 and the bellows I are, for a given setting, fixed, the valve 54 will be operated by a pressure differential between cabin pressure and atmospheric pressure.

In addition to the foregoing, the bellows III under certain conditions applies an overriding force upon the bellows I. The bellows III acts through a pin 75 engaged by a screw 76 threaded into a lever 77 and secured in adjusted position in the lever by a lock nut. The lever 77 is pivoted at 78 onto the pilot valve head 37, and has depending lugs 79 straddling the pin 68 and adapted to engage the top of the bellows I to apply a downward force tending to contract the bellows I. However, the engagement does not act upon the bellows I in the opposite direction, as the lugs 79 act to withdraw from the bellows I.

The force produced by the bellows III comprises the upward force of the bellows spring reduced by atmospheric pressure acting upon the outside of the bellows. When this force acts to compress the bellows I through the lever 77, it is modified in accordance with a leverage ratio. The point in operation of the bellows I at which the bellows III may become effective can be determined within reasonable limits by the adjustment of the screw 76.

Operation

The operation of the main valve 18 has already been indicated. In the typical application of this valve mechanism, namely to control aircraft cabin pressures at varying altitudes, cabin pressures will be potentially increased above atmosphere by means of a supercharger forcing air into the cabin. The device will be so connected that this cabin pressure is admitted to the outlet port 15 and may exhaust through the port 17 of the main valve when the valve 18 is open. The port 66 of the pilot valve mechanism will be connected to the outside of the cabin, while the port 65 of the pilot valve will open to cabin pressure.

In analyzing the several pressures operating the pilot valve mechanism, those operating the valve 47 will first be considered. Since the bellows III can operate only to reduce the closing pressure of the valve 47, but cannot raise that pressure above the predetermined maximum for which the bellows I is set, the operation caused by the bellows I may be considered first and separately from the bellows III. In the discussion to follow, the subindexes to the letter P indicate the source of the particular pressures. The opening pressure acting directly upon the valve 47 is P50. This is opposed by a resultant pressure of the bellows I, which pressure is composed of the spring pressure of the bellows itself, designated PI, minus pressure Pc. Thus, in a period of equilibrium at the point of opening of the valve 47, $Pc = PI - P50$. This, in turn, equals a constant C determined by the setting of the sleeve of the valve 47.

In the present control, this constant pressure is set at approximately 11 lb. of a pressure corresponding to atmospheric pressure at 7,500' altitude.

With such a setting, assume the curve to start at sea level with a pressure of 14.7#/sq. in. Since the net closing pressure produced by the bellows I and the spring 50 upon the valve 47 is 11 lb., atmospheric pressure within the cabin will permit opening of the valve 47 by collapsing the bellows I. As the craft leaves the ground with the supercharger operating, cabin pressure will remain above 11 lb., and follow Pa until an altitude of 7,500' is reached. When this point is passed, atmospheric pressure descends below the 11 lb., but cabin pressure will be boosted by the supercharger. As soon as cabin pressure exceeds the 11 lb. constant, the bellows I will collapse permitting the valve 47 to open so that cabin pressure is relieved to the lower atmospheric pressure until a predetermined maximum of 11 lb. is regained, whereupon the valve 47 will reclose. Thus, neglecting the slight variations necessary for operation of the mechanism, cabin pressure will follow the curve A—B until the predetermined constant pressure is reached for the cabin, and thereafter it will follow the constant curve B—C of Fig. 6.

There comes a time when the strength of the aircraft cabin is not sufficient to support a differential in pressure between the outside and the inside. For instance, if this differential in pressure be 7#/sq. in., a maximum permissible pressure differential curve could be plotted in which cabin pressure is constantly 7# greater than atmosphere. Such a point is reached at the point C of the curve B—C. If the absolute or constant pressure were maintained beyond the point C, the desired differential would be exceeded. At this point, the valve 54 can take over. It will be remembered that the valve 54 is urged open by the spring 55, and is urged closed by the resultant forces of the bellows II. These resultant forces are made up of the spring within the bellows and Pa minus Pc. Stated differently, $Pc = PII - P55 - Pa$ at an equilibrium point of opening of the valve 54. $P55 - PII$ is the constant determined by the setting of the sleeve 53. This constant is set at 7 lb. in the illustration given. Manifestly, if $Pc - Pa = 7$ lb., a reduction in Pa will permit cabin pressure to collapse the bellows II until the differential is restored. Consequently, for the interval from C to D on the chart, the valve 54 will be in control and will reduce cabin pressure below the absolute cabin pressure of 11 lb. in amount sufficient to maintain the maximum pressure differential.

As altitude increases, load on the supercharger increases. This occurs because as the atmospheric pressure approaches zero, whereas the constant differential pressure remains in higher figures, the volume of air required to be supercharged increases to such a point that the supercharger cannot properly provide enough air in volume to maintain the desired pressure, under the familiar law that pressure times volume is a constant. However, the supercharger operating only at what may be called "saturation point" of volume, will supply air to produce cabin pressure that bears a definable ratio to atmospheric pressure. It is desirable to regulate the cabin pressure to maximums within the proper capacity of the supercharger to avoid overloading it.

To this end, bellows III is provided to reduce the cabin pressure, when atmospheric pressure diminishes below a predetermined value.

In the illustration of Fig. 6, it is assumed that the supercharger beyond 40,000' cannot properly maintain a pressure seven lb. above atmospheric pressure, and that the supercharger capacity decreases more rapidly than atmospheric pressure.

The bellows III applies an upward force upon the pin 75 equal to spring pressure minus atmospheric pressure. At some point, this pressure, acting through the lever 77, may apply an additional pressure which is a function of atmospheric pressure against the bellows I to cause the absolute pressure determined by that bellows to be reduced as the atmospheric pressure decreases. As here shown, the pressure of the spring within the bellows III is slightly under 3 lb. pressure. Consequently, up until about 39,000' of altitude have been attained, atmospheric pressure will keep the spring within the bellows from having any effect upon the bellows I. However, at the point E, this altitude is reached after which atmospheric pressure no longer exceeds the bellows pressure, and the spring within the bellows begins to exert a force pivoting the lever 77 against the bellows I. This begins a reduction of the maximum pressure permitted by the bellows I. However, since at this time the main valve is under control of the valve 54, no sensible effect is produced.

As altitude increases and atmospheric pressure continues to decrease, the effect of bellows III increases and the reduction of the maximum pressure permitted by the valve 47 is further decreased. The rate of decrease thus produced is controlled by the leverage ratio of the lever 77. This leverage is predetermined to cause a decrease in cabin pressure sufficient to avoid overloading of the supercharger, but, nevertheless, to maintain as high a cabin pressure as can be. After the point D on the curve, the valve 47 will be opened at pressures lower than those at which the valve 54 is opened, so the valve 47 will again take control and the cabin pressure will follow the curve D—E.

From the foregoing, it will be seen that the control provides cabin pressures that follow atmospheric pressure for a predetermined range, which is ordinarily permissible, since persons can stand a decrease in pressure up to 8,000' without complication. Thereafter, up to above 30,000' the pressure is maintained at the 8,000' level. Then, in order to avoid an excess in pressure differential that would be damaging to the cabin structure, the pressure diminishes to maintain a constant minimum pressure differential. Finally at about 40,000', the pressure follows a curve that decreases more rapidly to keep the cabin pressure within the range of proper performance characteristic of the supercharger.

What is claimed is:

1. In a mechanism of the kind described, a main valve adapted to control the flow of air from a cabin or the like to the atmosphere, air pressure means to control opening and closing of said valve, including a bleed line, a pilot valve mechanism controlling the flow of air from said bleed line to atmosphere, said pilot valve mechanism including two valves in parallel both disposed in the bleed line, means responsive to the difference in pressure on two sides of the main valve to bleed the first of said pilot valves, a movable wall exposed to a pressure within the cabin, on one side, yieldable force producing means acting on said wall in opposition to said internal pressure, means connecting the wall and the second pilot valve to operate the same to bleed the line when internal pressure exceeds a predetermined value, additional pressure-responsive means producing a force that varies with changes in pressure external to the cabin, and means connecting said additional means with the second pilot valve accumulatively with the internal pressure acting on said movable wall.

2. In a control valve for controlling the relationship of fluid pressures within a container to pressures outside the same, a first pressure responsive means subjected to internal pressure and movable in one direction in response to increase thereof, a second pressure responsive means subjected oppositely to internal and external pressures and movable in one direction in response to increase in the differential of internal over external pressure, a third pressure responsive means subjected to external pressure and movable in one direction in response to decrease thereof, valve means controlling the flow of fluid between the interior and exterior of the cabin, and means to operate the valve means from said pressure responsive means, said operating means including connections to subject the valve means to operation by the first or the second pressure responsive means, independently of each other so that the valve means responds to the first pressure responsive means so long as the resulting pressure does not exceed the maximum differential, and then responds to the second pressure responsive means, and said operating means including connections between the third pressure responsive means and the valve means to apply forces of said third means to the valve means in opposition to the moving force of the first pressure responsive means to effect a maximum ratio of internal to external pressure and to operate the valve means when internal pressure exceeds said maximum.

3. In a mechanism of the kind described for controlling the relationship of fluid pressures within a container to pressures outside the same, a housing having a first and a second chamber therein, the first chamber being subjected to internal pressure and the second to external pressure, a first pressure responsive means in the first chamber resistingly movable in response to changes in internal pressure, a second pressure responsive means in the first chamber subjected to internal pressure, means applying external pressure to said second pressure responsive means so that it moves in response to a difference in internal and external pressures, a third pressure responsive means in the second chamber movable in response to changes in external pressures, valve means adapted to be operated by said pressure responsive means, and controlling fluid flow between the interior and exterior of the container, and connections between the first and second pressure responsive means and the valve means to effect operation of the latter upon movements aforesaid of the said two pressure responsive means, and connections to cause the third pressure responsive means to move the valve means against the first pressure responsive means when external pressure decreases below a predetermined value, whereby the valve means is operated to maintain a maximum ratio of internal to external pressure.

4. A control for regulating pressures within a container relative to pressures external thereto, including a valve for permitting flow from within the container to outside the same, control mechanism for the valve, comprising a first movable wall subjected on one side to internal pressures and oppositely to a predetermined yieldable force, means connecting said wall and the valve for opening the valve when the internal pressure exceeds the predetermined force, a second movable wall subjected on one side to external pressure and oppositely to a predetermined yieldable force, whereby said wall is acted upon by a force that tends to move it in a certain direction when the external pressure descends below a predetermined value, such force varying with external pressure, connecting means between the second wall and the valve to apply the force aforesaid to the valve in a direction to accumulate with the internal pressure acting upon the valve through the first movable wall, and means to maintain the pressure difference between the interior and exterior of the container within a predetermined amount.

5. A control for regulating pressures within a container relative to pressures external thereto, including a valve for permitting flow from within the container to outside the same, control mechanism for the valve, comprising a first movable wall subjected on one side to internal pressures and oppositely to a predetermined yieldable force, means connecting said wall and the valve for opening the valve when the internal pressure exceeds the predetermined force, a second movable wall subjected on one side to external pressure and oppositely to a predetermined yieldable force, whereby said wall is acted upon by a force that tends to move it in a certain direction when the external pressure descends below a predetermined value, such force varying with external pressure, connecting means between the second wall and the valve to apply the force aforesaid to the valve in a direction to accumulate with the internal pressure acting upon the valve through the first movable wall, said connecting means including a lever, a fulcrum therefor, and means for adjusting the connection between the lever and the second wall.

6. A control for regulating pressures within a container relative to pressures external thereto, including a valve for permitting flow from within the container to outside the same, control mechanism for the valve, comprising a first movable wall subjected on one side to internal pressures and oppositely to a predetermined yieldable force, means connecting said wall and the valve for opening the valve when the internal pressure exceeds the predetermined force, a second movable wall subjected on one side to external pressure and oppositely to a predetermined yieldable force, whereby said wall is acted upon by a force that tends to move it in a certain direction when the external pressure descends below a predetermined value, such force varying with external pressure, connecting means between the second wall and the valve to apply the force aforesaid to the valve in a direction to accumulate with the internal pressure acting upon the valve through the first movable wall, said valve being a pilot valve, a main valve having opposite pressure-receiving actuating walls, one subjected to internal pressure to open the main valve, the other being in a pressure chamber, restrictedly connected to the inlet side of the main valve and connected through the pilot valve to the outside, whereby the main valve may open when the pilot valve opens, and means to open the main valve when external pressure becomes less than internal pressure by a predetermined amount.

7. A control for regulating pressures within a container relative to pressures external thereto, including a valve for permitting flow from within the container to outside the same, control mechanism for the valve, comprising a first movable wall subjected on one side to internal pressures and oppositely to a predetermined yieldable force, means connecting said wall and the valve for opening the valve when the internal pressure exceeds the predetermined force, a second movable wall subjected on one side to external pressure and oppositely to a predetermined yieldable force, whereby said wall is acted upon by a force that tends to move it in a certain direction when the external pressure descends below a predetermined value, such force varying with external pressure, connecting means between the second wall and the valve to apply the force aforesaid to the valve in a direction to accumulate with the internal pressure acting upon the valve through the first movable wall, said valve being a pilot valve, a main valve having opposite pressure-receiving actuating walls, one subjected to internal pressure to open the main valve, the other being in a pressure chamber, restrictedly connected to the inlet side of the main valve and connected through the pilot valve to the outside, whereby the main valve may open when the pilot valve opens, a second pilot valve controlling connection of the pressure chamber to the outside independently of the first pilot valve, and means opening the second pilot valve in response to variations in internal pressure above external pressure by more than a predetermined difference.

8. A control for regulating pressures within a container relative to pressures external thereto, including a main pressure operated valve having a pressure chamber having connections to the inside and to the outside of the container, pilot valve means in one of said connections, including a first pilot valve and a second pilot valve each capable of separately regulating flow through said connection to operate the main valve, first and second movable wall means, the first being acted upon by internal pressure and yieldable force means to produce a net force in one direction when internal pressure exceeds a given value, the second being acted upon by external pressure and yieldable force means to produce a net force in one direction when external pressure is less than a given value, means to apply movements of the first wall means to the first pilot valve to effect movements of said valve in both directions, and means to apply the force of the second movable wall means in said one direction only, to said first pilot valve in opposition to the force of said first movable wall means in its one direction.

9. A control for regulating pressures within a container relative to pressures external thereto, including a main pressure operated valve having a pressure chamber having connections to the inside and to the outside of the container, pilot valve means in one of said connections, including a first pilot valve and a second pilot valve each capable of separately regulating flow through said connection to operate the main valve, first and second movable wall means, the first being acted upon by internal pressure and yieldable force means to produce a net force in one direction when internal pressure exceeds a given value, the second being acted upon by external pressure and yieldable force means to produce a net force in one direction when external pressure is less than a given value, means to apply movements of the first wall means to the first pilot valve to effect movements of said valve in both directions, and means to apply the force of the second movable wall means in said one direction only, to said first pilot valve in opposition to the force of said first movable wall means in its one direction, said means to apply force of the second movable wall means including a lever between said wall means and the valve, the lever having a fulcrum positioned to produce a predetermined ratio between the forces of said two wall means on the valve.

10. A control for regulating pressures within a container relative to pressures external thereto, including a main pressure operated valve having a pressure chamber having connections to the inside and to the outside of the container, pilot valve means in one of said connections, including a first pilot valve and a second pilot valve each capable of separately regulating flow through said connection to operate the main valve, first and second movable wall means, the first being acted upon by internal pressure and yieldable force means to produce a net force in one direction when internal pressure exceeds a given value, the second being acted upon by external pressure and yieldable force means to produce a net force in one direction when external pressure is less than a given value, means to apply movements of the first wall means to the first pilot valve to effect movements of said valve in both directions, and means to apply the force of the second movable wall means in said one direction only, to said first pilot valve in opposition to the force of said first movable wall means in its one direction, and a third movable wall means oppositely subjected to internal and external pressures, and to yieldable force means, the third movable wall means being connected with the second pilot valve to operate the same when the differential between internal and external pressures exceeds the value determined by the last-named yieldable force means.

JOHN E. DUBE.

REFERENCES CITED

The following references are of record in the file of this patent:

UNITED STATES PATENTS

| Number | Name | Date |
|---|---|---|
| 1,779,160 | Diehl | Oct. 21, 1930 |
| 1,779,162 | Evers et al. | Oct. 21, 1930 |
| 2,119,402 | Puffer | May 31, 1938 |
| 2,208,554 | Price | July 16, 1940 |
| 2,258,054 | Heidbrink | Oct. 7, 1941 |
| 2,307,199 | Cooper | Jan. 5, 1943 |

FOREIGN PATENTS

| Number | Country | Date |
|---|---|---|
| 521,623 | Great Britain | May 27, 1940 |